(12) United States Patent
Balet

(10) Patent No.: US 7,921,865 B2
(45) Date of Patent: Apr. 12, 2011

(54) STAND-ALONE MECHANICAL DEVICE FOR CONTROLLED WATERING

(76) Inventor: Bernard Balet, Marseilles (FR)

( * ) Notice: Subject to any disclaimer, the term of this patent is extended or adjusted under 35 U.S.C. 154(b) by 889 days.

(21) Appl. No.: 11/720,333

(22) PCT Filed: Nov. 14, 2005

(86) PCT No.: PCT/FR2005/002812
§ 371 (c)(1),
(2), (4) Date: Jun. 28, 2007

(87) PCT Pub. No.: WO2006/058976
PCT Pub. Date: Jun. 8, 2006

(65) Prior Publication Data
US 2008/0092956 A1    Apr. 24, 2008

(30) Foreign Application Priority Data
Nov. 29, 2004   (FR) ...................................... 04 12614

(51) Int. Cl.
*G05B 11/00*   (2006.01)
(52) U.S. Cl. .............................. 137/78.3; 47/48.5; 47/79
(58) Field of Classification Search ................. 137/78.1, 137/78.2, 78.3, 78.5; 47/48.5, 79
See application file for complete search history.

(56) References Cited

U.S. PATENT DOCUMENTS

| | | | |
|---|---|---|---|
| 3,244,372 A * | 4/1966 | Hanner | 137/79 |
| 4,055,200 A * | 10/1977 | Lohoff | 137/624.11 |
| 5,269,337 A | 12/1993 | Goldsmith et al. | |
| 6,269,563 B1 * | 8/2001 | Dagan | 40/107 |

FOREIGN PATENT DOCUMENTS

| | | |
|---|---|---|
| FR | 1270671 | 9/1961 |
| FR | 1380569 | 12/1964 |
| FR | 2416645 | 9/1979 |
| FR | 2856239 | 12/2004 |

* cited by examiner

*Primary Examiner* — Craig M Schneider
(74) *Attorney, Agent, or Firm* — Egbert Law Office PLLC

(57) ABSTRACT

The invention concerns an exclusively mechanical stand-alone device for controlled watering by sprinkling, wherein a soil simulating member, having an absorbent body associated with a reclinable cup arranged beneath, contributes to determination of the interval between two watering operations. A balance arm, bearing the absorbent body and an annular magnet, is mounted and balanced by a compressed spring, contributing to the determination of the opening and closing times of a valve. The valve includes a hydraulic relay with a nozzle triggering its opening or closure, in response to the displacement of the magnet field. An impermeable sleeve encloses the core and the nozzle. A sliding canopy enables one of the parameters determining the duration of the watering operation to be adjusted. A thermostatic element has an adjustable position preventing watering in sunshine. The device is mounted rotating on a pivot including the base of the sleeve and a tail unit.

8 Claims, 3 Drawing Sheets

STAND-ALONE MECHANICAL DEVICE FOR CONTROLLED WATERING

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The invention concerns soil watering and covers several stand-alone mechanical devices, which have in common one original characteristic that optimizes a controlled watering function.

2. Description of Related Art

Including Information Disclosed Under 37 CFR 1.97 and 37 CFR 1.98.

In many regions, watering cultivated plots is essential. To do so, one or more watering devices, generally sprinklers or drop watering systems, are connected to a source of water under pressure. Their water intake is automated by means of an electromagnetic valve, which is controlled by an electronic or electromechanical programming device that determines the successive moments when watering starts and stops. The results can never be entirely satisfactory because even users who are entirely familiar with their terrain cannot keep track of all the different parameters that govern the behavior of soils and plants with respect to water. Moreover, these installations are costly, and they all depend on a source of electrical power on the spot, a constraint that it would be useful to remove.

Controlled watering systems use several different models of electromagnetic valves that are available over the counter. Most of these models comprise a solenoid capable of bringing, into two stable predetermined positions, a ferromagnetic core fixed to the control nozzle of a hydraulic relay, which is activated by the pressure of the water and capable of causing the valve to open and close. Both core and nozzle are enclosed in an impermeable sleeve which runs through the solenoid. Experience has shown that this type of electromagnetic valve is particularly reliable.

The behavior with respect to water of the surface soil (less than 30 cm or so in depth) in which most plants grow depends on many different parameters, especially the soil's permeability, capillarity, water retention capacity, evaporation coefficient, exposure to dominant winds and the nature of the soil layers beneath. Concerning the plants, it must be remembered that watering in full sunlight can harm the leaves (magnifying effect of water droplets), and also causes immediate water losses of up to 70% through evaporation. These parameters are well known to specialists, but have not yet been taken into consideration by those with an interest in the construction of purely mechanical systems (i.e., which do not require any electrical power) for automatic controlled watering.

In the French patent No 78.04479 by Delattre, a stand-alone mechanical system is described, comprising a deep pan with perforated sides, mounted on a bistable balance arm, filled with a sample of soil and plants and balanced by a counterweight. The tipping motion of the pan, as it gains or loses weight with watering or evaporation and drainage, directly controls a mechanical valve. This heavy, cumbersome system is representative of most of the parameters concerned and can generate sufficient force to control the valve directly. However, because the plants are continually growing, it is not particularly reliable. It does not take sunlight into account and can neither change the duration of watering or the interval between two consecutive periods of watering.

In the French patent No 79.16748 by Brossard, a stand-alone mechanical controlled watering device is described, comprising a mechanical valve which is directly controlled by a pivoting arm, with a perforated basket containing an absorbent body at one end and a counterweight at the other end. Although this is a simple and realistic device, direct control of the mechanical valve, when subjected to the pressure of water, by means of the oscillating motion of the balance arm alone, requires a relatively high bearing force that is not available. Moreover, there is no means of regulating the duration and/or the intervals between watering, and exposure to sunlight is not taken into account.

In the French patent No 1.300.228 by Castelli, a stand-alone mechanical controlled watering device is described, comprising a container that can be filled by rainwater or irrigation water, associated with a pivoting float that directly controls a mechanical valve. This mechanical device only takes evaporation into account and is therefore unsuited to the problem addressed. Moreover, as in the previous cases, there is no means of regulating the duration and/or the intervals between watering, and exposure to sunlight is not taken into account.

In the French patent No 1.380.569 by Raucourt, a stand-alone mechanical controlled watering device is described, comprising a flap valve which is directly controlled by a lever arm. This is mounted onto a bistable pivot, which has a container filled with soil on one end and a counterweight on the other. As the container is not perforated, this device—like the previous one—is only representative of soil evaporation. Moreover, there is no means of regulating the duration and/or the intervals between watering, and exposure to sunlight is not taken into account. The flap valve needs considerable actuating force which the tipping of the balance arm alone is unable to provide.

Each of these known mechanical devices for controlled watering comprise a simulating member that reproduces various parameters governing the behavior of soils with respect to water, but these parameters are generally too few in number. The devices have no means for regulating the duration and/or intervals between watering or for taking exposure to sunlight into account. In addition, the effectiveness of the different means used to trigger the opening and closing of the valve is open to doubt, because of the amount of effort required.

The overall object of the invention is a stand-alone mechanical controlled watering device which can be actuated by a force of very low amplitude.

The first specific object of the invention is a stand-alone mechanical controlled watering device which enables the amount of water actually distributed to be continuously adapted to the actual needs of the plot and/or the different planters or pots to be watered.

The second specific object of the invention is a stand-alone mechanical controlled watering device which is at once economical, simple to manufacture and easy to use.

The third specific object of the invention is a stand-alone mechanical controlled watering device that comprises a simple, lightweight and easily handled soil-simulating member that takes into account the broadest possible range of parameters governing the behavior of soils with respect to water.

The fourth specific object of the invention is a stand-alone mechanical controlled watering device which, by means of a simple adjustment, can change the interval between two watering periods, insofar as the interval will depend on the condition of the soil, by simultaneously adjusting the characteristics, capillarity, permeability and water retention capacity of the simulating member in accordance with the characteristics of the soil concerned.

The fifth specific object of the invention is a stand-alone mechanical controlled watering device which, by means of another simple adjustment, can determine the duration of watering, insofar as the duration will depend on the condition of the soil.

The sixth specific object of the invention is a stand-alone mechanical controlled watering device which can shut off any further watering whenever sunlight becomes too strong.

The seventh specific object of the invention is a second stand-alone mechanical controlled watering device which is derived from the first and is specially adapted for drop watering of indoor plants in pots or planters.

The eighth specific object of the invention is a third stand-alone mechanical controlled watering device which is suited to every type of watering, including sprinkling or drop watering.

BRIEF SUMMARY OF THE INVENTION

According to the invention, the stand-alone mechanical controlled watering device comprising:
  a simulating member, which is as representative as possible of the behavior of the soil concerned with respect to water, and particularly of the water content of that soil;
  a sensor comprising a moving part which is sensitive to the soil's water content; and
  an apparatus operating in unison with this moving part and triggering the operation of a valve mounted between a source of water under pressure and at least one item of watering equipment.

The watering device is further characterized by the following:
  a valve comprising a hydraulic relay triggering the opening and closing of the valve;
  a hydraulic relay controlled by a nozzle connected to a ferromagnetic core, which is in turn associated with a spring; and
  a moving part of the sensor including a vertically moving magnet capable of bringing the ferromagnetic core into two stable positions.

A particular characteristic is a ring-shaped, axially polarized magnet placed so as to move freely around the sleeve enclosing the valve's ferromagnetic core.

This feature means that by incorporating a standard commercial electromagnetic valve, from which the solenoid has been removed, into the stand-alone controlled watering system corresponding to the invention, it is possible to produce a mechanical, magnet-controlled device with two successive triggering functions, where the second amplifies the action of the first. The first function is the movement of a magnetic field which acts upon the bistable ferromagnetic core connected to a nozzle. The second function is a hydraulic relay which is activated by the nozzle and by water pressure. This ensures maximum reliability, since only a negligible force from the moving part of the sensor is required to actuate the function. Consequently, the end positions of the magnet on the moving part, which reflect the minimum and maximum water content of the soil simulator, are easily and immediately capable of starting up and shutting off watering.

This stand-alone controlled watering device can be produced for three main applications. In the first and second applications, the soil simulator includes a component that more or less represents the soil, while in the third application, a sample taken from the actual soil concerned is used for the same purpose. The first application is appropriate for watering in the open air with a sprinkler attachment, while the second is appropriate for drop-by-drop watering. The third is appropriate for all types of watering.

In accordance with the characteristics of the first and second applications of this stand-alone mechanical controlled watering device corresponding to the invention, the moving part of the sensor is a balance arm connected with an absorbent body, the whole being cantilever-mounted to oscillate around a fixed shaft. A spring adjacent to this shaft balances the total weight of the balance arm and the weight attached to it, whenever the absorbent body contains a predetermined average amount of moisture.

These two applications offer a particularly simple and effective way of building two entirely mechanical stand-alone controlled watering devices corresponding to the invention. The component parts of the devices are defined and assembled on the principle of functional separation and each part has its own reliability. The same is true of the ring-shaped, axially polarized magnet, whose action is identical to that of the solenoid which it replaces in order to control the valve. Thus, when the weight of the absorbent body, when saturated, brings the balance arm to its lowest position, the magnet abruptly causes the core and its nozzle to move, thus actuating the hydraulic relay which closes the valve. Symmetrically, when the weight of the absorbent body is low enough to bring the balance arm to its highest position, the magnet abruptly causes the ferromagnetic core and its nozzle to move in the opposite direction, thus causing the hydraulic relay to open the valve.

In accordance with a series of further characteristics of the first application of the stand-alone controlled sprinkler-watering device and corresponding to the invention, the simulating member also comprises, placed beneath the entire absorbent body at least, an elongated container that is notably larger in width than the absorbent body. The lower part of the absorbent body fits into this container to rest on its bottom. The container may tilt around a longitudinal axis.

Thanks to this configuration, part of the water falling onto the device corresponding to the invention will soak into the absorbent body, and part of it will accumulate in the container. The volume of water that can be captured in this way can be adjusted by tilting the container, from which more or less water will thus overflow. The angle of tilt is determined by experimentation. Under these conditions, the permeability, capillarity and water retention capacity of the simulating member, which is made up of the absorbent body together with the tilted container and is representative of the surface soil layers to be watered, will be adjusted. In addition to this adjustment, the simulating member will provide a near simulation of the water retention capacity of the underlying soil layers. In accordance with the characteristics of the two parts making up the soil-simulating member, on the one hand, and with the state of the climatic environment of the location on the other hand, water loss from the simulating member may occur for a period of several hours to several days. The water loss is due to the evaporation of the water absorbed by capillarity by the absorbent body and then, once the container has dried out, of the water held in the absorbent body.

Evaporation will depend on the ambient air temperature and humidity, on the amount of sunlight received and on wind strength. Under these conditions, given the construction of the absorbent body, the tilt of the container on its shaft provides the experimental adjustment of the share pertaining to the particular soil concerned in the interval between watering periods.

In accordance with another specific characteristic of the device, a retractable canopy is mounted above the absorbent body to act as a variable-deployment canopy for the absorbent body.

With this arrangement, only an adjustable fraction of the amount of water falling on the device corresponding to the invention will enter the absorbent body. In this way, the duration of watering can easily be adjusted in accordance with a given watering intensity, from a minimum duration determined by the water retention capacity of the absorbent body alone, which fixes the maximum weight, when the protective canopy is fully withdrawn, up to a maximum duration when the canopy is fully extended and thus protects most of the absorbent body from falling water.

In accordance with another specific characteristic of the system, a thermostatic element which is sensitive to sunlight, protected from rainfall and fitted with a retractable, positionable stop, is fixed above the balance arm so that it can prevent any upward movement of the arm whenever sunlight intensity exceeds a predetermined threshold and, in the reverse situation, allow the arm to move upwards.

Thanks to this arrangement, no further watering can take place when sunlight is too intense. This avoids damage to plants as well as any watering resulting in high water loss.

In accordance with another specific characteristic of the invention, the device comprises:
  a rigid frame in a horizontal U shape, with two horizontal arms and one vertical part;
  an upper arm supports a thermostatic element;
  the upper arm also supports a retractable canopy;
  the lower arm supports a spring which balances the balance arm;
  the lower arm also has a hole through which the sleeve enclosing the core and nozzle is inserted;
  the lower arm has a support for the pivot of the container; and
  the upright supports the fixed shaft of the balance arm.

These arrangements make the stand-alone and entirely mechanical controlled watering system corresponding to the invention particularly simple, lightweight and easily handled.

In accordance with a series of specific characteristics that are complementary to the above:
  the upper arm of the rigid frame has a hole through which is inserted a stop fixed to the end of the sleeve;
  the upper arm of the rigid framework is supported on the end of the sleeve and the framework as a whole is mounted so as to rotate freely around the sleeve; and
  a tail unit is fixed to the upright and/or to the upper arm of the frame.

Thanks to this arrangement, the system corresponding to the invention also functions as a wind-vane, and the absorbent body always faces into the prevailing wind. This allows effective simulation of the drying action of the wind in the upper layers of the soil to be watered.

In accordance with the invention, a stand-alone mechanical controlled watering device for indoor drop watering, corresponding to the second application defined above, is characterized by the fact that the pipe downstream from the valve is fitted with a water intake point connected to a spout capable of allowing water to drip over the absorbent body.

Thanks to this arrangement, the stand-alone and entirely mechanical controlled watering device for drop-watering indoor or greenhouse plants, which is therefore sensitive only to the humidity and temperature of the premises, has been reduced to its minimal form of application comprising only the component parts needed for this particular method of use.

In accordance with the invention, the stand-alone mechanical controlled watering system corresponding to the third application defined above is characterized by the following:
  the soil simulator has a reference case with a container attached beneath;
  the reference case is capable of containing a sample of soil and at least one plant;
  the sample is representative of the soil to be watered and, in the case of planters or flower pots, of at least the type of soil they contain;
  the container is capable of holding water;
  the base of the reference case has a perforated area around the periphery, resting on the bottom of the container and preferably supported on one or more inserts;
  the moving part of the sensor is a float installed so as to move freely within a space between the bottom of the container and the base of the reference case; and
  the float has a ring-shaped magnet that revolves freely around the housing of the bistable ferromagnetic core controlling the nozzle of the valve's hydraulic relay.

In accordance with the specific characteristics made possible by the apparatus described above, the watering equipment installed downstream from the valve is:
  either a series of spouts, each being capable of allowing water to drip onto the soil in the reference case and the soil in the planters to be watered; or
  a series of spouts, each being capable of allowing water to flow in a thin stream directly into the container under the reference case and into the planters to be watered, the containers being fitted with crown-shaped lids to minimize evaporation of the water held within them; or
  a sprinkler system to water the soil on the ground or in a series of planters, when the reference case and its contained are installed in the watered area.

With this third application, it is possible, in accordance with the invention, to build a stand-alone, entirely mechanical, simple and effective device to control all types of watering. The relevant components are also defined and assembled in line with the principle of separating the different functions, each of which has its own reliability. This means that when the water level in the container takes the float down to its lowest point, the magnet causes the valve to open. Symmetrically, when the water in the container reaches a predetermined level, the float follows and its magnet abruptly moves the mobile ferromagnetic core and its nozzle in the reverse direction, which causes the hydraulic relay to close the valve.

It should be noted that the soil sample contained in the reference case must be representative of the soil to be watered by sprinkling, which means that the minimum surface area has to be not only wide enough (at least around ten decimeters square) but also of about the same height and type as the cultivated layer of the soil in question. In the case of planters, however, the volume of soil in the reference case does not have to be the same as in the planters to be watered. This is thanks to the regulation of the flow from the spout on the reference case, 15 or 20 minutes for example, to which the specific flows from the planter spouts are adjusted so that they correspond respectively to the specific volume of soil in each planter.

In accordance with one characteristic additional to those described above, the inserts installed between the peripheral perforated zones in the reference case and the bottom of its container are high enough to leave the space required for the float to move freely around the bistable core of the valve.

In accordance with a second characteristic additional to those described above, the associated container is double-bottomed. The high-capillarity inserts are placed on the hollow crown-shaped level and the float can come to rest on the lower level, placed in the center.

Thanks to the first of these two arrangements, the reference case model, which can be used according to the invention to create a stand-alone controlled watering system, may be of any kind. Thanks to the second additional arrangement, the opening of the valve may be adjusted so as to be triggered some time after the end of the capillary continuity between the upper level of the water in the lower base of the container and the perforated zones in the bottom of the reference case. This allows the soil sample in the reference case to begin to dry out, a process known to be favorable to plant health and which will thus be reproduced in the soil on the ground or in the planters to be watered.

BRIEF DESCRIPTION OF THE SEVERAL VIEWS OF THE DRAWINGS

The characteristics and advantages of the invention will appear more specifically from the description below, which refers to three variations of the device which are presented here as non-limiting examples, with references to the annexed drawings.

Figure 1:
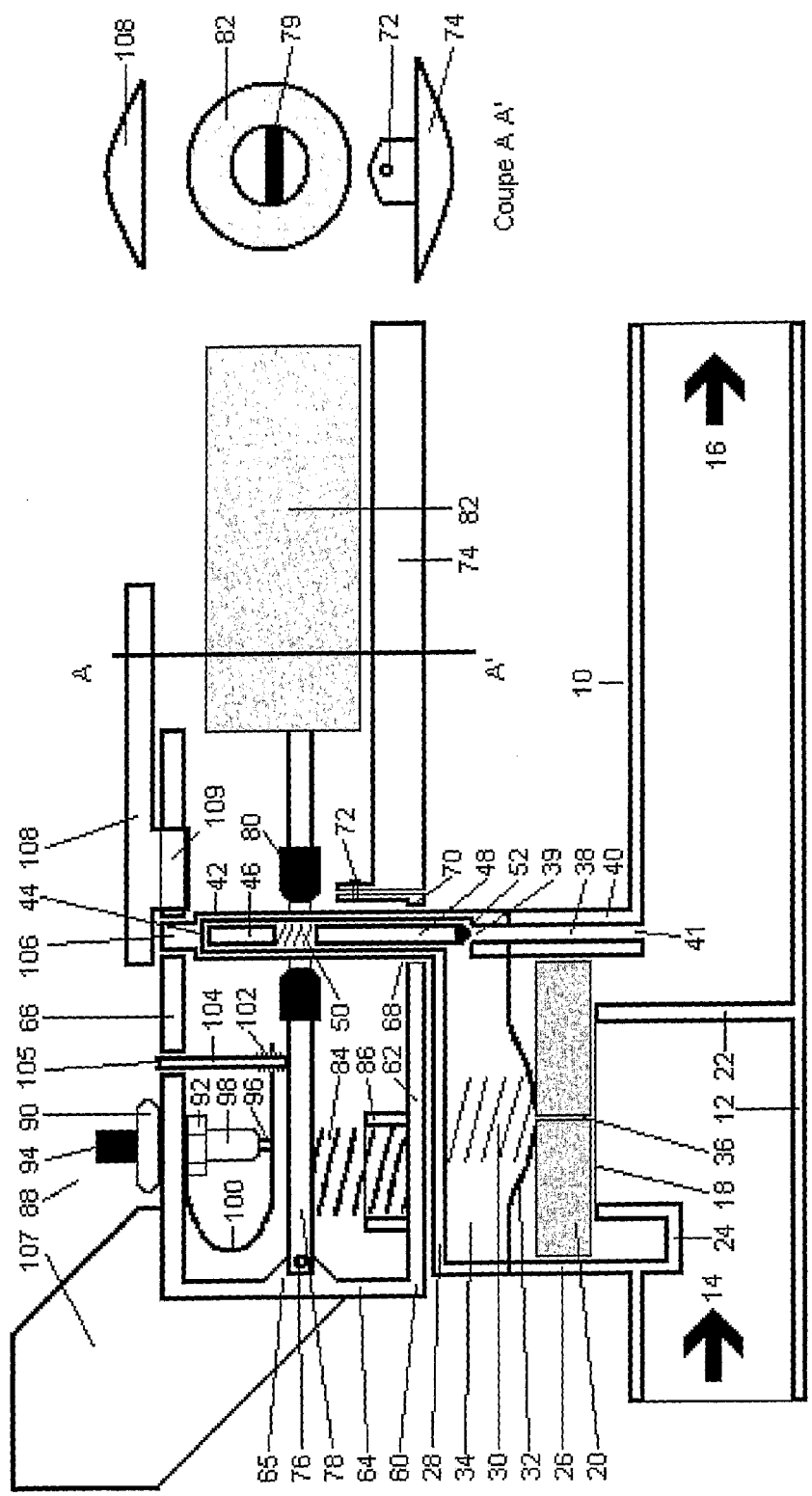
FIG. 1 is a schematic illustration of a section of a stand-alone mechanical controlled watering device corresponding to the present invention, for open-air sprinkling.
Figure 2:
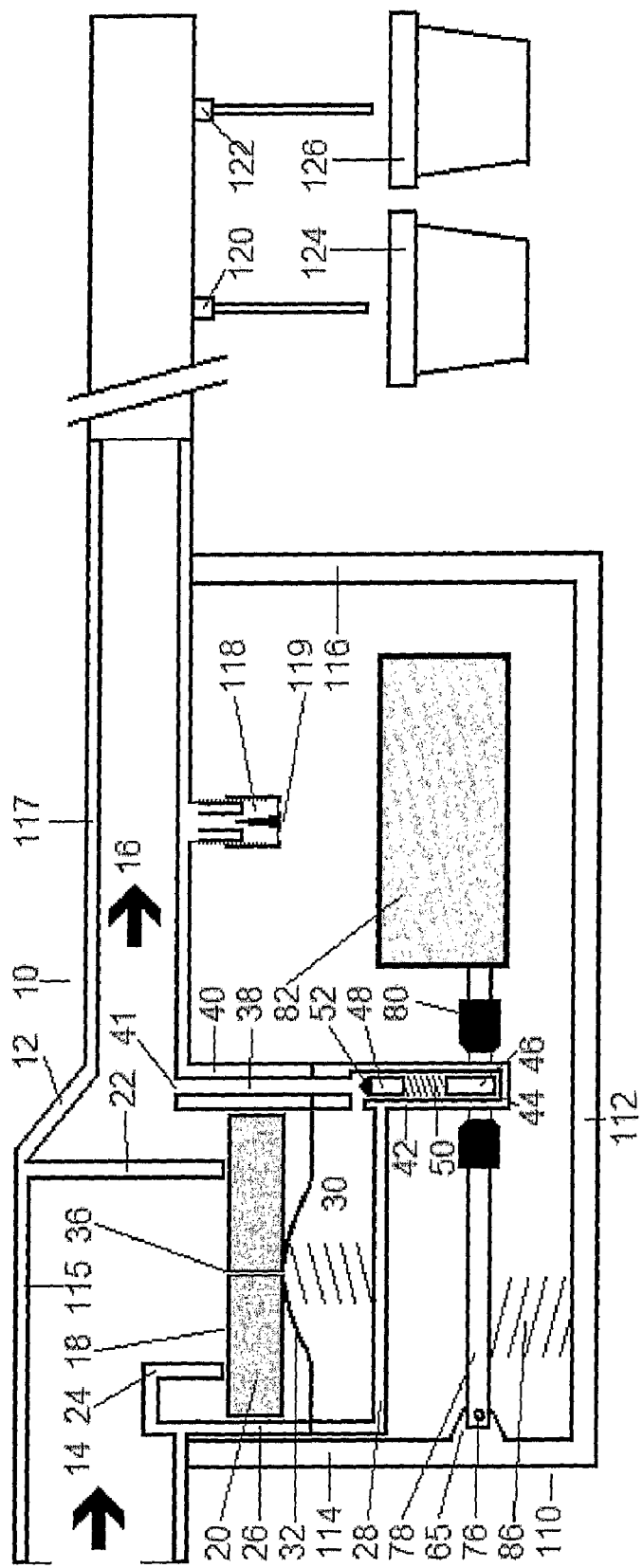
FIG. 2 is a schematic illustration of a section of a stand-alone mechanical controlled watering device corresponding to the present invention, for indoor drop watering.
Figure 3:
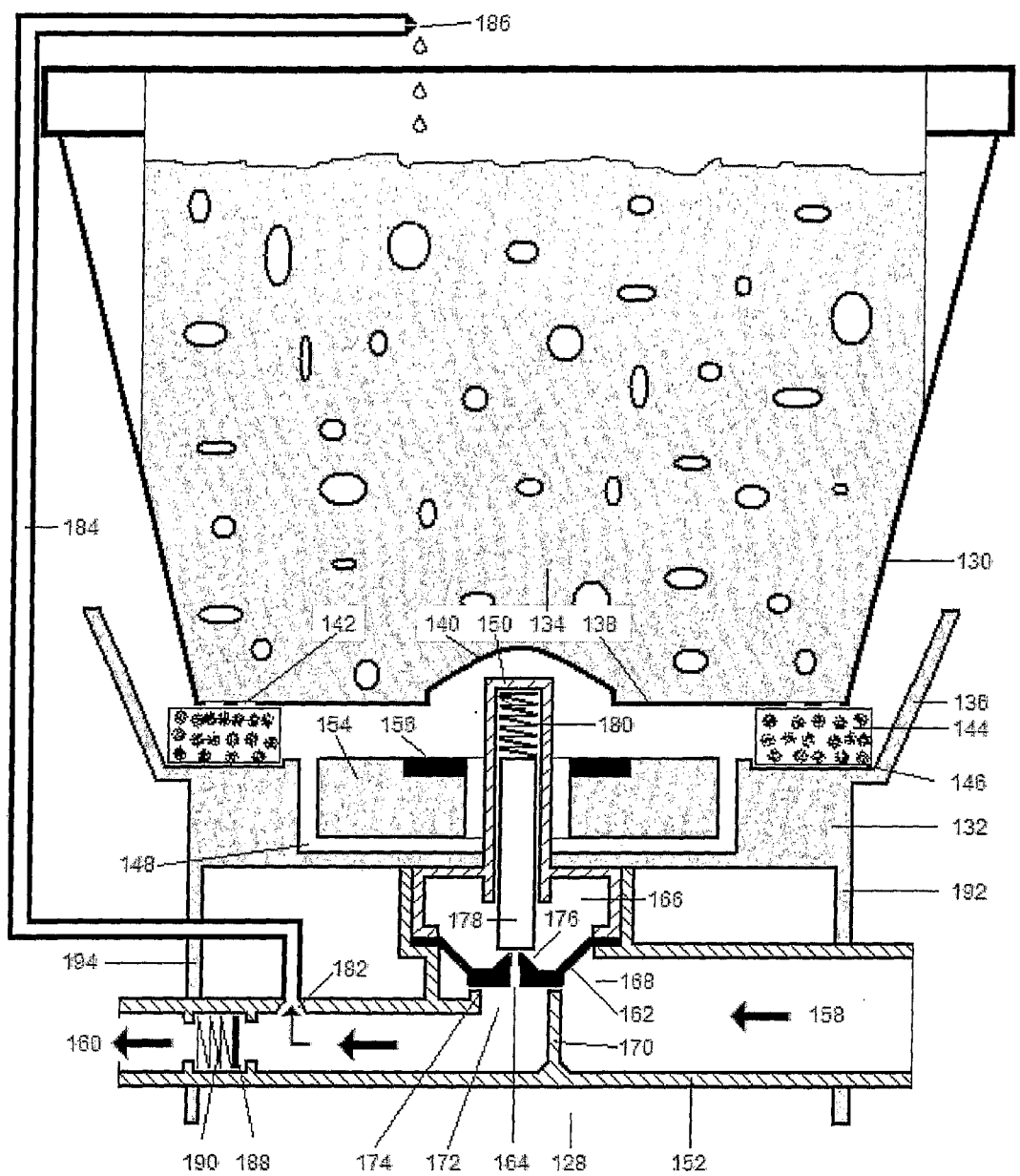
FIG. 3 is a schematic illustration of a section of a stand-alone mechanical controlled watering device corresponding to the present invention, for all types of watering.

The diagrams in FIGS. 1, 2 and 3, respectively, represent the section of three stand-alone mechanical controlled watering devices corresponding to the invention, the first for open-air sprinkling, the second for indoor drop watering and the third for all types of watering.

DETAILED DESCRIPTION OF THE INVENTION

FIGS. 1 and 2 show two stand-alone mechanical controlled watering devices for outdoor and indoor use respectively, corresponding to the first and second applications of the invention. These devices both include a mechanical valve (10), triggered by a hydraulic relay, which is made up of a standard electromagnetic valve from which the solenoid has been removed. One piece (12) of this valve (10) is a rigid plastic tube with a round section, capable of being connected horizontally, by means of standard fittings not shown here, to a hosepipe for water under pressure placed upstream (arrow 14) and a watering device installed downstream (arrow 16). The valve (10) is made up of a piston (20) sliding through a circular aperture (18) formed by the conjunction of two curved transverse baffles (22-24), each fixed to an area diametrically opposite the tube (12). The piston (20) is capable of sliding in and out in a cylinder (26) with a base (28) that supports a spring (30) capable of thrusting the piston (20) to the rim of the circular aperture (18). The cylinder (26) is divided in half by a flexible membrane (32), whose rim is attached to the wall of the cylinder and whose central part is attached to the piston (20). The chamber (34) thus created between the flexible membrane (32) and the base (28) communicates with the upstream part of the curved transverse baffle (22) through a narrow channel (36) drilled down the center of the piston (20), and with the downstream portion of the baffle (22) through another narrow channel (38) drilled through a protruding part (40), which is common to the cylinder (26) and the tube (12). The narrow channel (38) has a cone-shaped orifice (39) and another orifice (41) opening onto the downstream part of the curved baffle (22).

Attached to the protruding part (40) and the ceiling (28) is a cylindrical sleeve (42) comprising a base (44) and an orifice that communicates with the chamber (34) and the narrow channel (38). Two ferromagnetic cores (46 and 48) are placed within the sleeve (42), and separated by a fairly loose spring (50), which is slightly compressed in its resting position. The core (46) is fixed to the bottom (44) of the sleeve (42) while the core (48) is free to slide within the sleeve (42). The core (48) is a small stem whose free end is fitted with a rubbery bush (52), to form a nozzle capable of closing the orifice (39) of the narrow channel (38).

FIG. 1 shows how the rigid plastic frame of the stand-alone mechanical device (60) for controlled open-air watering, corresponding to the invention, is fixed to the valve (10) so as to rotate freely. The frame of the device (60) is about four centimeters wide and shaped as a horizontal U, with a short lower arm (62), a vertical stem (64) and a longer upper arm (66). A circular hole (68) is drilled into the lower arm (62), to which is fitted, at its free end, a small vertical support (70) with a drilled hole through which is threaded a fixed shaft (72), which may be an ordinary screw. Mounted so as to rotate on this shaft is an elongated container (74) about 10 centimeters in length, 5 centimeters in width and two centimeters in depth. The device would benefit from an arc-shaped profile for the bottom of the container (74) and a container fashioned from the solid part of a cylinder with the rest of the cylinder wall (not shown) forming a grid around the absorbent body (82) to protect it from the various impacts it is liable to receive.

In the middle of the vertical stem (64) are two embossments (65) into which is inserted a pivot (76), parallel to the line of the connection of the lower arm (62). Cantilever-mounted on the pivot (76) is a rigid balance arm (78), about fifteen centimeters in length and of the same width and material as the U-shaped frame of the device (60). The middle part of the balance arm (78) is fitted with a ring-shaped, axially polarized magnet (80). The free end (79) of the balance arm (78) is flat and supports an absorbent body (82), cylindrical in shape or slightly conical, with a maximum diameter of about 3 centimeters at the end nearest to the pivot (76) and six centimeters in length. The absorbent body (82) is a hollow sleeve in a synthetic absorbent material, which is forced onto the free end (79) of the lever arm. When the balance arm (78) is at its lowest point, the absorbent body (82) rests on the bottom of the container (74).

A helical spring (84) inserted into a ring (86) is attached adjacent to the pivot (76), between the balance arm (78) and the lower arm (62) of the device (60). The gap between the ring (86) and the pivot (76) is permanently fixed so that the spring (84) can balance the total nominal weight of the balance arm (78) and the load it bears. In this equilibrium position, the absorbent body (82) will hold a reference mass of water that simulates an average water content determined for the soil in question.

On the upper arm (66) of the device (60), beneath a transparent canopy (not shown), a thermostatic element (88) with a washer face (90) is attached by means of a nut (92). This type of thermostatic element (88) (available over the counter) contains, within a capsule (94), a thermo-dilatable and highly heat-conductive mixture (of metal powder and wax, for example). This mixture is separated by the diaphragm of a piston fixed to a spring finger (96) protruding from a flexible sleeve (98), which is fitted with a curved retraction spring leaf (100) attached with the nut (92) to the arm (66) of the device (60). The spring finger (96) will move by a few millimeters whenever the temperature of the capsule (94) rises from 20 to 50° C. due to the heat of the sun. In response to the maximum displacement of the spring finger (96), the balance arm (62) is prevented from rising above a given position, which is fixed by a retractable and positionable stop (102). This stop is the threaded end of a rod (104) screwed into a tapped hole in the free end of the leaf spring (100), whose slit head (105) moves freely through a hole made for this purpose in the upper arm (66) of the frame of the device (60). The stop (102) determines the highest position which the balance arm (78) is able to reach when the temperature of the capsule (94) of the thermostatic element (88) exceeds a given threshold.

The upper arm (66) of the frame of the device (60) has a hole drilled through it into which is inserted a stop (106) which forms a pivot attached to the base (44) of the sleeve (42). In this way, this lower face of the upper arm (66) of the frame of the device (60) may be installed to rest on the base (44) of the sleeve (42). Under these conditions, the upper arm (66) is mounted to rotate around the shaft (106) and the entire frame of the device (60), assembled to rotate around the sleeve (42), while the same sleeve (42) is inserted through both the hole (68) drilled into the lower arm (62) of the frame of the device (60) and the ring-shaped magnet (80) of the balance arm (78) of the device. Attached to the upright stem (64) and to the upper arm (66) of the frame of the device (60) is a dual-function tail unit (107). Firstly, its mass serves to balance the entire rotating part of the device (60) resting on its pivot (44), whenever the water content of the absorbent body (82) reaches an average reference value. Secondly, it forms a wind-vane which is integral to the device (60).

Also on the upper arm (66) of the frame of the device (60) and mounted so as to slide with friction along lateral hooks (109) placed on the edges of the upper arm (66), is a canopy with a curved top (108) making up a variable-deployment umbrella placed above the absorbent body (82).

In FIG. 2, showing the second application in accordance with the invention, a valve (10), triggered by a hydraulic relay identical to that in FIG. 1, is placed above a stand-alone mechanical device (110) for controlled indoor watering. This device (110) comprises a rigid frame in the shape of an upright U, with a horizontal base (112) and two vertical arms of equal length (114-116), whose arc-shaped upper edges support the upstream (115) and downstream (117) ends of the tube (12) on the valve (10). The device (110) comprises several active parts that are identical to those in the device (60) in FIG. 1, i.e.: embossments (65), pivot (76), balance arm (78), ring-shaped magnet (80), absorbent body (82) and balance spring (86). When the balance arm (78) is in its lowest position, the sleeve (42) of the valve (10) is disengaged from the ring-shaped magnet (80), and when the balance arm (78) is in its highest position, the ring-shaped magnet (80) is half-way between the ferromagnetic cores (46-48). Installed above the absorbent body (82), in the downstream portion (117) of the tube (12) on the valve (10), is a pre-adjusted device (118) for drop watering, equipped with an adjustable nozzle (119). Fitted to the end of the downstream portion (117) of the tube (12) are several drop-watering devices, such as 120 and 122, which are identical to the device (118) and placed just above the planters, such as 124 and 126, containing indoor plants that require a given amount of drop watering.

Provided herein is a detailed description of the functioning of a valve (10) made from a standard electromagnetic valve from which the electrical command solenoid has been removed. The valve thus becomes a new component, i.e., a magnetically controlled valve, which functions in response to the movement of a moving magnet. When the valve (10) is open, the piston (20) is at a distance from the aperture (18) of the valve, and when it is closed, the piston rests on the rim of the aperture. When actuated by the magnet (80), the rubbery end (52) of the bistable ferromagnetic core (48) operates as a nozzle and closes the orifice (39) of the narrow channel (38), so that the chamber (34) no longer communicates with the channel (38) or, therefore, with the downstream portion of the curved transverse baffle (22). At that moment, the valve (10) is still open and its piston (20) is still at a distance. Through the pressure-equalizing channel formed by the narrow central channel (36) in the piston (20), the water pressure upstream from the baffle (22) is quite rapidly transferred to the chamber (34). The pressures on either side of the flexible membrane (32) of the chamber (34) gradually equalize. As soon as the pressure is equal on either side, the spring (30) in the chamber (34) is able to push the piston (20) to the point where it closes the aperture (18) of the valve (10). Symmetrically, when, in response to the movement of the magnet (80), the rubbery end (52) of the core (48) moves away from its resting position on the orifice (39) of the narrow channel (38), the chamber (34) again communicates with the channel (38) and therefore with the downstream part of the transverse baffle (22). At that moment, the piston (20) in the aperture (18) of the valve (10) is still resting on the aperture (18) and the valve is closed. Through the lower orifice (41) of the narrow channel (38) which opens onto the downstream part of the curved baffle (22), the water pressure in the chamber (34) lessens and rapidly equalizes with the pressure downstream from the baffle (22). The spring (30) in the chamber (34) is then compressed by the piston (20), as it becomes subject to the water pressure upstream from the baffle (22), which gradually frees the aperture (18) of the valve (10) until it is fully open.

When, during the course of watering, the total weight of the balance arm (78), the magnet (80) and the absorbent body (82), the soil simulator and the water collector becomes greater than the maximum force created by the balance spring (86), the balance arm (78) moves all the way down to a lower stop formed by the bottom of the container (74), with which the lower end of the slightly conical absorbent body (82) comes into contact. At that moment, the ferromagnetic core (48), which is still being attracted by the fixed core (46), but has been previously magnetized by the nearby presence of the ring-shaped magnet (80), compresses this spring (50) as the magnet (80), mounted on the balance arm (78), gradually moves away and quickly weakens the attraction between the two cores. The attractive force lessens until it becomes slightly weaker than the compression force of the spring (50). At this point, actuated by the spring (50) pushing it away, the core (48) abruptly drops down from its high position and causes the nozzle (52) to close the orifice (39) of the narrow channel (38). As described earlier, this abruptly causes the valve to close.

When the evaporation of water in the container (74), and then in the absorbent body (82), reduces the weight of the absorbent body to its minimum level, the balance arm (78) reaches its highest position, the ferromagnetic core (48), attracted by the ring-shaped magnet (80) fixed to this arm and by the now re-magnetized core (46), becomes subject to a force which has gradually become closer to the force created by the compressed spring (50), until it exceeds that force. At this point, the latter force allows the core (48) to move away from the lower stop so that it abruptly moves towards the magnet (80) and the core (46). The effect of this is to open the orifice (39) of the narrow channel (38) and, as indicated earlier, to abruptly trigger the opening of the valve (10).

This valve (10) remains open as long as the balance arm (78) has not returned to its lowest position, i.e. at the bottom of the container (74), in other words for as long as the amount of water in the absorbent body (82) remains below the threshold where watering is shut off and which corresponds to a maximum soil moisture content. As explained above, the oscillation of the container (74) around its longitudinal shaft determines the additional quantity of water that will adjust the simulations of permeability, capillarity and water retention capacity made by the soil simulator (formed by the combination of the absorbent body (82) and the container (74) placed below it) to the actual state of the soil concerned. Under these conditions, adjusting the tilt of the container (74) effectively determines the time required under the climatic conditions of the location before water is only present in the absorbent body (82) of the simulating organ. Consequently, since the evaporation time of the water contained in the absorbent body and in the container is entirely dependent on the parameters of these climatic conditions (air humidity and temperature and sun and wind strength), the purpose of adjusting the tilt of the container (74) is to add to the fixed period of time determined by the absorbent body (82) alone, which can thus be adjusted, in accordance with the actual situation, so that the portion of time relating to the soil is included in the total length of the interval between two consecutive periods of watering.

During a period of watering triggered by the stand-alone mechanical device (60), thanks to the presence of the canopy (108), only an adjustable fraction of the amount of water falling onto the device (60) will enter the absorbent body (82). In this way, the duration of watering can easily be adjusted from a minimum duration determined by the water retention capacity of the absorbent body alone, which determines its maximum weight when the protective canopy is retracted, up to a maximum duration when the protective canopy (108) is fully open and protects most of the absorbent body (82) from any watering. This has the direct effect of increasing the time taken by the absorbent body to reach its maximum weight.

However, the behavior of the device (60) for controlled outdoor watering corresponding to the invention, as described above, is conditional since it is subject to the actual state of sun exposure of the plot to be watered and, because of this, may vary from the above description. As soon as exposure to the sun becomes too high, the thermostatic element (88), which is protected from falling water, takes over to control the operation under the conditions determined by the position of the retractable and positionable stop (102). In strong sun, the temperature of the capsule 94 increases and the thermo-sensitive mixture it contains will dilate. Under these conditions, when the spring finger (96), brings the adjustable stop (102) into contact with the balance arm (78), thus preventing the arm from rising above a given intermediate position, no further watering can be triggered, at least as long as the sun remains strong. When the sun weakens, the curved leaf spring (100) brings the spring finger (96) back to its resting position.

This loss of weight of the absorbent body (82) of the stand-alone mechanical controlled watering device (60) may also, in accordance with the invention, be representative of the soil drying out due to wind. This is achieved by the fact that the device (60) is able to function as a wind-vane. Because of the broad total evaporation surface of the sleeve-shaped absorbent body (82), when it faces into the wind it more or less represents the soil's behavior with respect to wind. However, as this characteristic is not always required, the device (60) may be attached to the valve (10) by any appropriate means and the tail unit (106) may be dispensed with.

The absorbent body (82) of the stand-alone mechanical device (110) for controlled watering of indoor plants, shown in FIG. 2, is sensitive only to the ambient humidity and temperature of the premises concerned. To ensure accurate simulation of the pots and planters, an adjustable drip spout (118) is placed above the absorbent body (82) to supply it with, for example, one or two drops per second (0.1 to 0.2 $cm^3$). The duration of watering of the reference case is a reference duration (from 15 to 20 minutes) that depends on the previous flow of water and on the volume of the absorbent body (82) of the watering device (110). This reference duration is the time taken by the absorbent body, starting at its minimum weight, to achieve its maximum weight as it absorbs a particular amount of water. In order to water planters and pots, spouts similar to those indicated above are used but with a much larger flow of water (1 to 8 liters/hour, for example). The flow of water from these spouts is adjusted according to the reference durations and volumes of soil in the planters and pots. All other circumstances being equal, the device (110) in FIG. 2 functions in exactly the same way as the device (60) in FIG. 1. The interval between two watering operations depends exclusively on the ambient climate of the premises concerned.

FIG. 3 shows a stand-alone mechanical device for controlled drop-by-drop watering (128), in accordance with the third application of the invention defined above. In FIG. 3, the soil simulating member comprises a reference case (130) and an associated container (132). The reference case (130) is an ordinary plastic item which is available over the counter. It has the shape of a truncated cone and measures, for example, 30 cm at the top and 20 cm at the bottom, and 20 cm in height. Its purpose is to contain a sample of soil (134) and at least one plant (not shown). The soil sample is representative of the soil and, in the case of planters, of at least the type of soil in the planters. The container (132) is an original plastic item with a flared rim (136), whose purpose is to hold both water and the sensor that triggers the operation of the stand-alone mechanical controlled watering device corresponding to the invention.

The reference case (130) has a flat bottom (138), with a small concave area (140) in its center and a peripheral area (142) with a circular series of perforations. The perforated area (142) rests on a crown (144) of absorbent felt, 2 cm in height and 4 cm in width, which is placed upon the crown-shaped upper base (146) of the container (132). In the center of the container (132) is a circular lower base (148) with an opening in the center into which will fit the sleeve (150) enclosing the bistable core of a mechanical, magnetically-controlled valve (152). Encircling the sleeve (150) so as to revolve freely around it is a ring-shaped float (154), with an outer diameter of 10 cm, an inner diameter of 3 cm and 2 cm in thickness, for example. It is fitted in its middle with a powerful, axially polarized, ring-shaped magnet (156).

The mechanical valve (152), triggered by a hydraulic relay, is made up of a standard electromagnetic valve, which differs from the valve mentioned previously but from which the solenoid has also been removed. This valve (152) has an upstream pipe segment (158) and a downstream pipe segment (160), and is capable of being connected horizontally to an upstream hose for water under pressure and to a watering device installed downstream. The valve (152) has a thick rubber membrane (162), with a narrow channel (164) passing through it. The periphery of the membrane (162) is circular and fixed to the walls of an intermediate chamber (166). Part of the membrane (162) closes an aperture (168) formed between a curved transverse baffle (170) and the upper end of the upstream segment (158) of the valve (152). The curved transverse baffle (170) forms another circular aperture (172) with the upper rim (174) of the upstream end of the downstream segment (160) of the valve (152). The central part of the membrane (162) closes this aperture (172). The narrow channel (164) ends at the point of an inner cone (176). On this point is a ferromagnetic core (178), installed with its support spring (180) in the sleeve (150). Installed downstream from the aperture (172) is a water intake point (182) connected by means of a small pipe (184) to a spout (186) capable of feeding water drop by drop onto the soil sample (134) in the reference case (130). Installed downstream from the water intake point (182) is a back flow valve (188) with its own spring (190). The upstream and downstream pipe segments (158 and 160) of the valve (152) are fitted into the appropriate openings made in the uprights (192 and 194) of the feet of the container (132).

With this apparatus, it is possible to create another stand-alone mechanical automatic watering device which is particularly simple, effective and cheap. First of all, the only original part in the soil simulator thus made is the container, which is a molded plastic article that is relatively simple to manufacture. Secondly, the moving part of the sensor reacting to the water content of the simulator is, in this case, a simple float that rests of the water contained in the container.

When the lower base (148) of the container (132) is dry, the float (154) rests on the base, and the magnetic field of the magnet (156) causes the ferromagnetic core (178) to rise and compress the spring (180), to allow maximum water flow. This causes the intermediate chamber (166) to communicate with the downstream part of the baffle (170). Under these conditions, the water pressure in the chamber (166) lessens until it equalizes with the water pressure upstream from the back flow valve (188), held back by its spring (190). And despite the stiffness of the membrane (162), the aperture (168) opens under the pressure of the water feeding into the watering system. Through the water intake point (182) and the pipe (184), the spout (186) drips water onto the soil sample (134) in the reference case (130). After about twenty minutes, this water reaches the lower part of the soil sample (134). The surplus water then drips through the peripheral perforated area (142) in the base of the reference case (130) to collect in the lower base (148) of the container (132). When the float (154) and its magnet (156), lifted by the gradually rising water level, have risen almost to the top of the sleeve (150), the magnetic attraction exerted by the magnet on the core (178) becomes weaker than the force exerted by the compressed spring (180). The core (178) is then abruptly pushed back to its lowest position. This shuts off the narrow channel (164) and causes the central part of the membrane (162) to close firmly over the aperture (172), and the relevant lateral portion of the membrane to close over the aperture (168). This causes the valve (152) to close, thus shutting down watering. The duration of watering thus determined by the control device corresponding to the invention is again a reference duration, on the basis of which the flow from the drip spouts for each planter and pot to be watered will be adjusted in accordance with their respective volumes of soil.

With sun, wind and plant roots taking up water, the soil sample (134) in the reference case (130) gradually dries out, but meanwhile, the water in the container (132) is taken up by capillarity into the same soil sample, through the absorbent crown (144) and the perforations in the peripheral area (142). This keeps its water content at an acceptable level as long as the water level in the container (132) is above the lower face of the felt crown (144). This can last for several hours and even several days, especially if rainfall replaces watering.

As soon as the crown (144) is no longer in contact with the water in the container, it gradually dries out and the soil sample (134) in the reference case (130) does likewise for a certain amount of time. This amount of time is determined by the time it takes for the small quantity of residual water contained in the bottom of the container (132) to evaporate naturally. These two successive phases, decreasing water content followed by temporary dehydration of the soil sample (134) and of the soil in the planters or in the area to be watered, are known to be favorable to plant health. As soon as the float (154) rests on the lower base (148) of the container (132), the magnet (156) again attracts the ferromagnetic core (178), the valve (152) opens and watering begins anew.

It should be noted that replacing the absorbent insert (144) with a dry insert, or even removing the inserts altogether, does not fundamentally affect the working of the soil simulating member made up of the reference case (130) and its container (132). The simulating member simply functions less effectively since it is less representative of what is happening in the planters to be watered or in the cultivated surface soil layer and the soil layers beneath.

In particular, it should be noted that a spout (186) suitable for drop watering of the soil sample (134) in the reference case (130) is simply the first of three possible ways of applying the third method of use of the stand-alone mechanical watering device corresponding to the invention. The second method simply involves replacing the spout (186) with a small pipe delivering a thin stream of water directly into the container (132). In this case, a crown-shaped lid will be placed over the container (132) in order to minimize evaporation of the water contained in it. The planters to be watered will be treated likewise.

With the third method, the spout (186) and the small pipe that may replace it are dispensed with altogether. In this situation, the reference case (130) and the soil layer or all of the planters or pots to be watered (pots in close-set rows in a horticulture center for example) are watered identically by sprinkling (preferably at night or in cloudy weather) and the containers for these planters or pots are dispensed with. The reference case will need to satisfy three essential conditions: (1) its minimum surface area must be relatively broad (at least 10 square decimeters, for example), (2) the soil sample it contains must be identical to the soil on the ground or in the planters or pots concerned (3) its height must be the same as the depth of the planters, pots or surface soil layer of the cultivated plot concerned.

The invention is not restricted to the application examples described here, and each of the component parts of the three devices corresponding to the invention may be made in different ways, provided that these different ways correspond to the definition given in the patent claims below.

In this regard, it should be noted in particular that the examples described make use of commercial, non-electrical electromagnetic valves in two specific models, triggered by hydraulic relays. Other models of electromagnetic valves with a hydraulic relay are obviously available and work perfectly well. The fact of removing their solenoid and replacing it with a ring-shaped or C-shaped magnet, in accordance with the claims set out below, makes it possible to incorporate them into stand-alone and entirely mechanical controlled watering devices corresponding to the invention.

With the first application of the invention, the balance arm can obviously be made with two lever arms mounted to a pivot and balanced, in this case, with a compressed spring and/or one or more balancing weights.

Concerning the assemblage above the valve (10) of the stand-alone mechanical device for controlled watering of indoor plants (110), this may be reversed, as shown in FIG. 1. In this case, a water intake point on the downstream pipe (117) is connected to a rigid pipe ending in a drip spout (118) placed above the absorbent body (82).

Similarly, as in the case shown in FIG. 3, the valve (152) may be installed in the base of the reference case (130), by making a passage for the sleeve (150) of the ferromagnetic core (178) in the bottom of the case. The reference case (130) must then be equipped with a set of feet of appropriate height and thickness, the float (154) is installed between these feet and the associated container is either a standard item or virtually identical to the double-bottomed container (132). This apparatus will function in a very similar way to that shown in FIG. 3.

I claim:

1. A stand-alone mechanical controlled watering apparatus comprising:
    a soil stimulator having an absorbent body and a humidity sensor, said absorbent body corresponding to a behavior of soil with a water content, said humidity sensor having a moving part with a movement proportional to a humidity of said absorbent body;
    a valve connected between a source of pressurized water and at least one watering device; and
    a hydraulic relay performing a binary control function of opening said valve and closing said valve, said hydraulic relay being associated with a means for transforming movement of said moving part into said binary control function, said means for transforming being magnetic, said means for transforming comprised of a magnet and a ferromagnetic core urged upon by a retraction spring, said spring and said ferromagnetic core being enclosed within a sleeve, said humidity sensor having a single moving part placed on a stand and attached to said absorbent body, said absorbent body being mobile, said magnet incorporated into said moving part so as to directly activate said ferromagnetic core and to perform a magnetic control function, said soil stimulator having a reference case and an associated container, said reference case containing a sample of soil and at least one plant, said sample of soil being representative of the soil to be watered and a type of soil, said associated container containing water, said reference case having a base, said base having at least one perforated area resting on said base of said associated container, said base being supported by at least one insert, said moving part of said humidity sensor being a float freely movable in a central chamber between a bottom of said associated container and a bottom of said reference case, said float fitted with a ring-shaped magnet, said ring-shaped magnet being engaged around a sleeve housing of a bistable core of the hydraulic relay control valve.

2. The stand-alone mechanical controlled watering apparatus of claim 1, wherein said magnet is either ring-shaped or C-shaped, said magnet being engaged around said sleeve of said ferromagnetic core.

3. The stand-alone mechanical controlled watering apparatus of claim 1, further comprising:
    a series of spouts capable of dripping water onto the soil, wherein water flow from a spout of a reference case and volume of soil in said reference case determine a reference watering duration, and wherein water flow from the spout is adjusted in accordance with the reference duration and with the volume of soil.

4. The stand-alone mechanical controlled watering apparatus of claim 1, wherein said associated container comprises a base with a central opening having a rim encircling the sleeve housing of said bistable core of said valve and a set of feet fashioned to serve as fixed supports for pipe segments upstream and downstream from said valve.

5. The stand-alone mechanical controlled watering apparatus of claim 1, further comprising:
    a plurality of inserts installed between the perforated peripheral areas of said reference case and the bottom of said associated container, said plurality of inserts being tall enough to leave sufficient space for said float to revolve freely around said sleeve housing of the bistable core of said valve.

6. The stand-alone mechanical controlled watering apparatus of claim 5, wherein said associated reference case is fitted with relatively tall and thick feet with a perforated base or with a centrally concave base and a peripheral area with several series of holes.

7. The stand-alone mechanical controlled water apparatus of claim 5, wherein said associated reference case is fitted with a centrally concave base and a peripheral area with several series of holes.

8. The stand-alone mechanical controlled watering apparatus of claim 5, wherein said associated container has a double bottom, said associated container having a crown-shaped upper level supporting high-capillary inserts and a lower level having a middle, said float resting in said middle.

* * * * *